United States Patent [19]

Hildreth

[11] 4,344,587
[45] Aug. 17, 1982

[54] AUTOMATIC MOTORIZED FISHING REEL

[76] Inventor: W. C. Hildreth, 331 NW. Sherbrooke Ave., Port St. Lucie, Fla. 33542

[21] Appl. No.: 66,406

[22] Filed: Aug. 14, 1979

Related U.S. Application Data

[63] Continuation-in-part of Ser. No. 896,716, Apr. 17, 1978, abandoned.

[51] Int. Cl.³ .................. A01K 89/017; A01K 89/02; B66D 1/14
[52] U.S. Cl. ...................................... 242/106; 43/26.1; 192/6 R; 242/84.1 A; 242/99; 242/211; 254/347; 254/366
[58] Field of Search .................... 242/84.1 A, 99, 106, 242/211–214, 216, 220; 43/26.1; 192/6 R, 6 B; 188/26, 71.2, 71.1; 254/347, 366

[56] References Cited

U.S. PATENT DOCUMENTS

| | | | |
|---|---|---|---|
| 1,871,386 | 8/1932 | Pflueger | 242/84.1 R |
| 2,189,956 | 2/1940 | Kurzina, Jr. | 188/26 |
| 2,190,398 | 2/1940 | Bugatti | 242/84.1 A |
| 2,709,867 | 6/1965 | Routh | 242/84.1 A |
| 2,714,271 | 8/1955 | Stratton | 242/84.1 A |
| 3,069,109 | 12/1962 | Galec | 242/84.2 A |
| 4,004,366 | 1/1977 | Berry | 242/106 |

Primary Examiner—Billy S. Taylor

[57] ABSTRACT

The present invention relates to an automatic motorized fishing reel which includes a frame and a spool rotatably coupled thereto for receiving and storing fishing line thereon. An electrical motor is coupled to the frame for rotating the spool in a direction for winding the fishing line onto the spool. The motor also induces a drag upon the rotation of the spool while the spool is unwinding. A clutch is operably interposed between the spool and the electrical motor for enabling the spool, when in a first condition, to rotate in the direction for unwinding the fishing line therefrom. When in a second condition the clutch provides positive engaging connection between the spool and the electrical motor for producing mutual corresponding rotation therebetween. The clutch switches between the first and second conditions responsive to a substantial torque differential exerted between the spool and the electrical motor. In this manner the spool will rotate when in the first condition for unwinding the fishing line therefrom, but will change into the second condition responsive to a substantial increase in the tension on the fishing line which is characteristic of a fish hitting the baited hook attached to the end of the fishing line.

12 Claims, 4 Drawing Figures

AUTOMATIC MOTORIZED FISHING REEL

BACKGROUND OF THE INVENTION

This is a continuation-in-part of my patent application Ser. No. 896,716 filed Apr. 17, 1978, now abandoned.

I. Field of the Invention

The present invention relates to an automatic motorized fishing reel and more specifically to a motorized fishing reel of the type utilized on commercial fishing vessels. The fishing reel automatically switches between an unwinding condition and a second condition in which the electrical motor induces a drag upon the unwinding of the fishing reel from the storage spool.

II. Description of the Prior Art

The commercial fishing business is extremely competitive. Many nations throughout the world have extremely large fishing fleets which include large processing ships and a great number of trawlers which are utilized to catch the fish and transport the fish to the processing ship or mother ship. Many of these trawlers utilize large fishing nets for trapping and funneling the fish into a smaller area in which they may be more easily captured and harvested. Another type of fishing employs the use of baited fishing hooks which are then trolled behind the fishing vessel. Typically this type of fishing is utilized to catch the larger fish such as tuna, snapper, king, wahoo, grouper, etc.

The present invention is directed toward commercial fishing of the latter type in which a fishing ship or trawler trolls several lengths of fishing line each having attached to one end thereof a baited hook of sufficient size to attract the large fish. Typically these larger fish live and congregate in schools of relatively dense population. As the fishing vessel discovers the location of this school of fish, the vessel may often catch as many as one thousand pounds of fish in as little as one or two hours. This period of good fishing may abruptly terminate when the fish migrate away from the area of the vessel or when the fishermen on the vessel have exhausted their capacity to catch additional fish. Therefore it is extremely important for the fishermen to be able to rapidly remove the fish from the hook, attach new bait to the hook, and then deploy the hook and the bait into the water at a sufficient distance behind the fishing vessel so that the fish will not be distracted by the presence of the vessel or its wake.

The presently accepted standard mode of operation for large fishing vessels is to utilize a winch or other electromechanical motor that is directly coupled to a spool onto which the fishing line is wound and unwound. Typically the unwinding of the fishing line requires the winch to be run in the reverse direction at a very slow speed until the baited hook is fully deployed. This procedure is usually hastened by the fisherman employing a hand-over-hand pulling technique to accelerate the deployment of the fishing line. This hand-over-hand method often causes a fouling of the fishing line on the reel when the inertia of the reel causes the spool to continue its angular rotation while the fishing line itself is not removed from the spool. This backup of the fishing line causes the diameter of the circumferential wrap of the fishing line around the spool to enlarge to the point where the diameter of the wrap exceeds the diameter of the spool circumference. This causes loops of the fishing line to escape from the spool and to become tangled around the shaft that supports the spool. This typical tangle is known as a backlash.

Some commercial reels also include a free wheeling or unwinding mode in which the drag induced on the baited hook as the vessel moves through the water will unwind the fishing line. However, operation in this mode often causes fouling of the line in heavy fishing situations (such as fishing in a large school of tuna, etc.) where a fish hits and takes the hook before the reel is switched into the drag mode. In this case the fish often accelerates away from the boat thereby causing a sudden acceleration of the rotation of the reel followed by a slack in tension on the line. As any fisherman knows, this slack in tension while the reel is in the fast unwinding mode will cause a severe backlash of the line on the reel. These backlashes can cause many hundreds of dollars of lost revenue when they occur to fishermen at the beginning of a long and extensive encounter with a large school of fish. Presently the only proven method for curing the backlash is to sacrifice the tangled fishing line by cutting the line in order to expose the longest unentangled end and then disposing of the remainder of the tangled line. This not only wastes expensive fishing line, but more importantly it wastes time which could be more efficiently utilized in catching the fish.

Therefore, it is a first object of the present invention to disclose the use of an automatic clutch interposed between the spool and the drive means for allowing the spool to rotate when the baited hook is being allowed to play out behind the fishing vessel. Typically the hydrodynamic drag induced as the baited hook is pulled through the water will create a sufficient tension upon the fishing line to gradually unwind the fishing line from the spool. Therefore, the present invention utilizes this tension for slowly and smoothly unwinding the fishing line from the spool.

A still further object of the present invention is to employ a readily available, durable and inexpensive clutch which can be adapted for use with commercial fishing reels. A first preferred embodiment of the present invention employs a specific adaptation of the typical bicycle-type coaster brake as the clutch for regulating the relative motion of the fishing spool.

An additional and further object of the present invention is to adapt the clutch actuator mechanism to simultaneously engage and couple electrical power to the electromagnetic motor which is used to wind the fishing line onto the spool. In this manner the probability of backlash will not only be reduced, but the reel becomes automatic in that the motor is actuated as soon as the fish hits the bait in order to wind the fishing line onto the spool and, therefore, "reel-in the catch."

While the preferred embodiment of the present invention will be explained with reference to Bendix Coaster Brake model 76, it should be understood by one skilled in this art that the invention may be constructed with various other forms of coaster brakes, such as those disclosed in U.S. Pat. Nos. 2,213,165; 2,215,965; 2,215,970; 2,189,956; 2,286,986; 2,410,785; 2,423,070; 2,445,616; and 2,510,032.

SUMMARY OF THE INVENTION

The present invention relates to an automatic motorized fishing reel which includes a frame and a spool rotatably coupled to the frame for receiving and storing fishing line thereon. Drive means are operably coupled to the frame and to the spool for rotating, responsive to a first signal, the said spool in a first direction so as to wind the fishing line onto the spool. The drive means induces drag upon the rotation of the spool in a direction opposite the first direction. Clutch means are operably interposed between the spool and the drive means for enabling the spool in a first condition to freely rotate in the opposite direction for unwinding the fishing line therefrom. The clutch means in a second condition positively engages the spool with the drive means for producing mutual corresponding rotation therebetween.

The clutch means switches between the first and the second conditions responsive to the torque exerted between the spool and the drive means being within a predetermined operative range. In this manner the spool will freely rotate when in the first condition for unwinding the fishing line therefrom, but will change into the second condition responsive to an increased tension on the fishing line which is characteristic of a fish taking and running with a hook attached to the end of the fishing line.

BRIEF DESCRIPTION OF THE DRAWINGS

Other objects, features and advantages of the present invention will be apparent from a study of the written description and the drawings in which.

DETAILED DESCRIPTION OF THE PREFERRED EMBODIMENT

Figure 1:
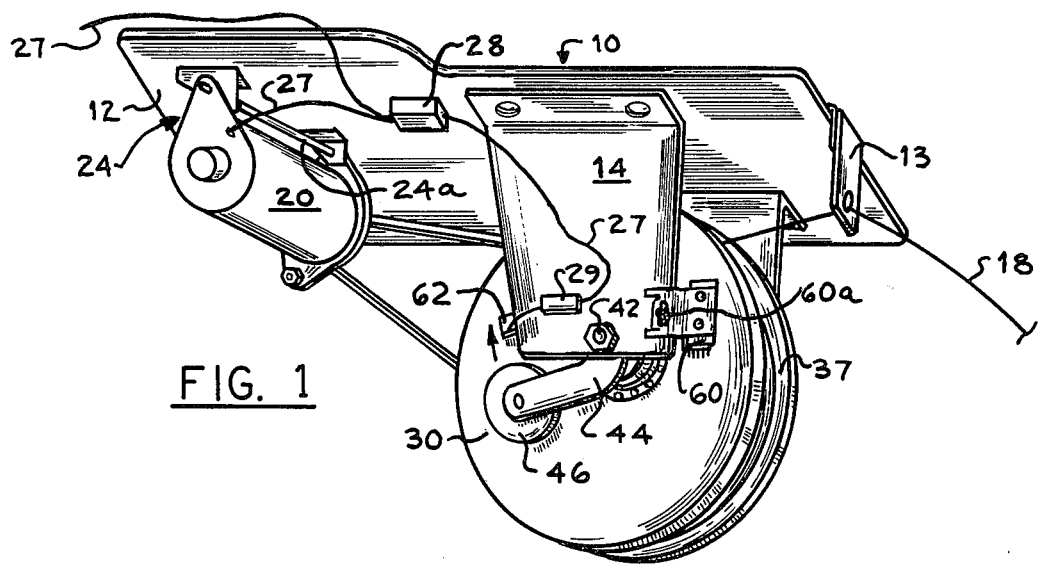
FIG. 1 illustrates a side perspective view of a first preferred embodiment of the automatic motorized fishing reel in accordance with the teachings of the present invention.
Figure 2:
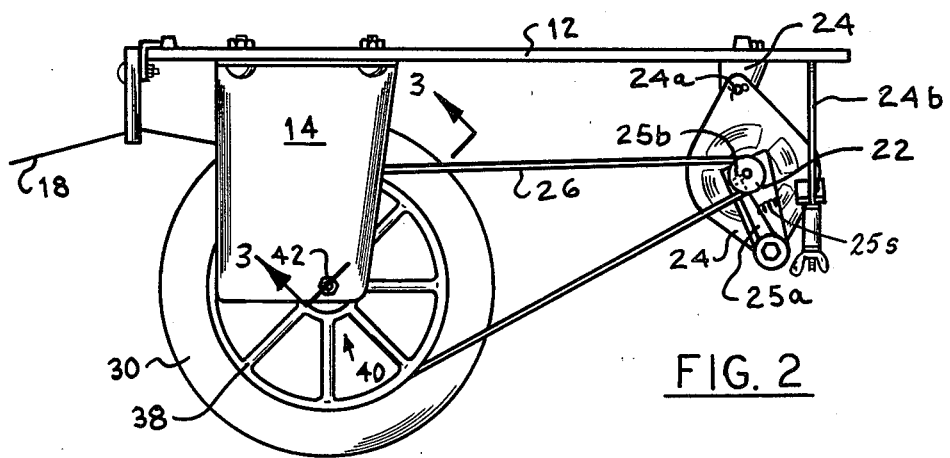
FIG. 2 illustrates a side elevation view of the first preferred embodiment of the automatic motorized fishing reel in accordance with the present invention.

A motorized fishing reel in accordance with the present invention is shown generally in the FIGS. 1 and 2. The fishing reel includes a frame, shown generally as 10, which includes a base section 12 and paired generally upstanding side supports 14 attached thereto. The base 12 includes adjacent a front end thereof a line guide 13 which includes therein an aperture for receiving therethrough a fishing line 18.

An electrical motor 20, or other equivalent driving means, is coupled to a rear section of the base 12. In a first preferred embodiment of the present invention the electrical motor 20 comprises a 12-volt motor of the compound differential type which produces approximately 55 pounds of pull through an attached primary pulley 22. This particular electrical motor has been chosen in order to provide a takeup capacity of approximately 300 or more feet of fishing line per minute when coupled with the remaining elements of the fishing reel. The electrical motor 20 has been waterproofed in order to provide reliable operation in the hostile environment of salt water or fresh water. The electrical motor 20 is adjustable mounted by the bracket 24 to the base 12 in order that the position of the electrical motor 20 and the primary pulley 22 may be movably adjusted about a pivot line defined by shaft 24a by the wing nut as shown in FIG. 2 in order to regulate the tension exerted on a drive belt 26.

The motor 20 pivots about the shaft 24a and is held in place by the length of the adjustable bolt 24b which is coupled between the bracket 24 and the base 12 as illustrated in FIGS. 1 and 2.

The electrical motor 20 is typically coupled to the 12-volt electrical system of the boat by the electrical conductor 27 which includes therein a main power switch 28 for allowing the operator to manually control the application of electrical energy to the motor. A second automatic power switch will be discussed subsequently.

Figure 3:
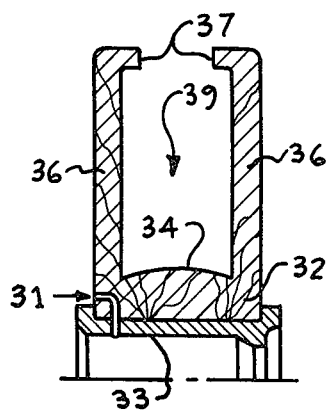
FIG. 3 illustrates a half cross-section view of the spool as taken along section lines 3—3 as shown in FIG. 2.

A spool 30 is attached to an automatic clutch, shown generally as 40 in FIG. 2, which in turn is coupled through a central shaft 42 to the paired side supports 14 of the frame 10. Also, a secondary or driven pulley 38 is attached to the automatic clutch 40 about the central shaft 42 for controllably engaging and rotating the spool 30 through the application of energy supplied by the electrical motor 20 through the drive belt 26 which is coupled between the primary drive pulley 22 and the secondary drive pulley 38. The spool 30 is formed from a marine wood sealed with Fiberglas Resin and includes, as shown in FIGS. 2 and 3, a central hub 32 which includes a convex outer circumferential surface 34 for receiving and storing the fishing line 18 thereon.

Paired spool sides 36 are coupled to the end sections of the central hub 32 for extending radially outward in order to guide and contain the fishing line 18 stored therebetween. Typically, these spool sides 36 are approximately 10 inches in diameter and include around the outer circumferential edges thereof a lip or flange 37. The two lips 37 attached to the paired spool sides 36 tend to reduce the effective exit aperture area of the spool 30 for retaining the fishing line 18 therein in cases when the line fouls or backlashes. If a backlash or other sudden expansion of the effective circumference of the outermost windings of the fishing line 18 occurs, the backlash will generally be retained within the void 39 defined by the lips 37, the spool sides 36 and convex circumferential surface 34.

The convex circumferential surface 34 is primarily designed in order to more evenly distribute the windings of the fishing line 18 throughout the entire width of the central hub 32 rather than the typical distribution of the winding of the fishing line 18 which is heavily weighted toward the center portion of the central hub 32. In the event of minimal backlash the convex circumferential surface 34 causes the wire line 18 to expand sideways from the center line and to be guided by the inner spool lip 37 so as to be captive within the u-shaped spool void. As long as the line 18 remains within the spool void, the entanglement is minimal.

As illustrated in FIG. 1, a brush 60 or other effective braking surface is coupled to one of the side supports 14 for communicating with the adjacent one of the spool sides 36. The screw 60a adjusts the pressure of the brush 60 with respect to the spool side 36, thereby providing a continuously adjustable, constant resistance to the free rotation of the spool 30 about the central shaft 42. In this manner the spool 30 will typically induce a slight drag upon the winding or unwinding of the fishing line 18 thereupon. This residual drag is easily overpowered by the application of rotational energy from the electrical motor 20 in either the winding or unwinding modes, but the residual drag will assist in the prevention of line backlash when the spool 30 is in the freewheeling and unwinding modes.

Figure 4:
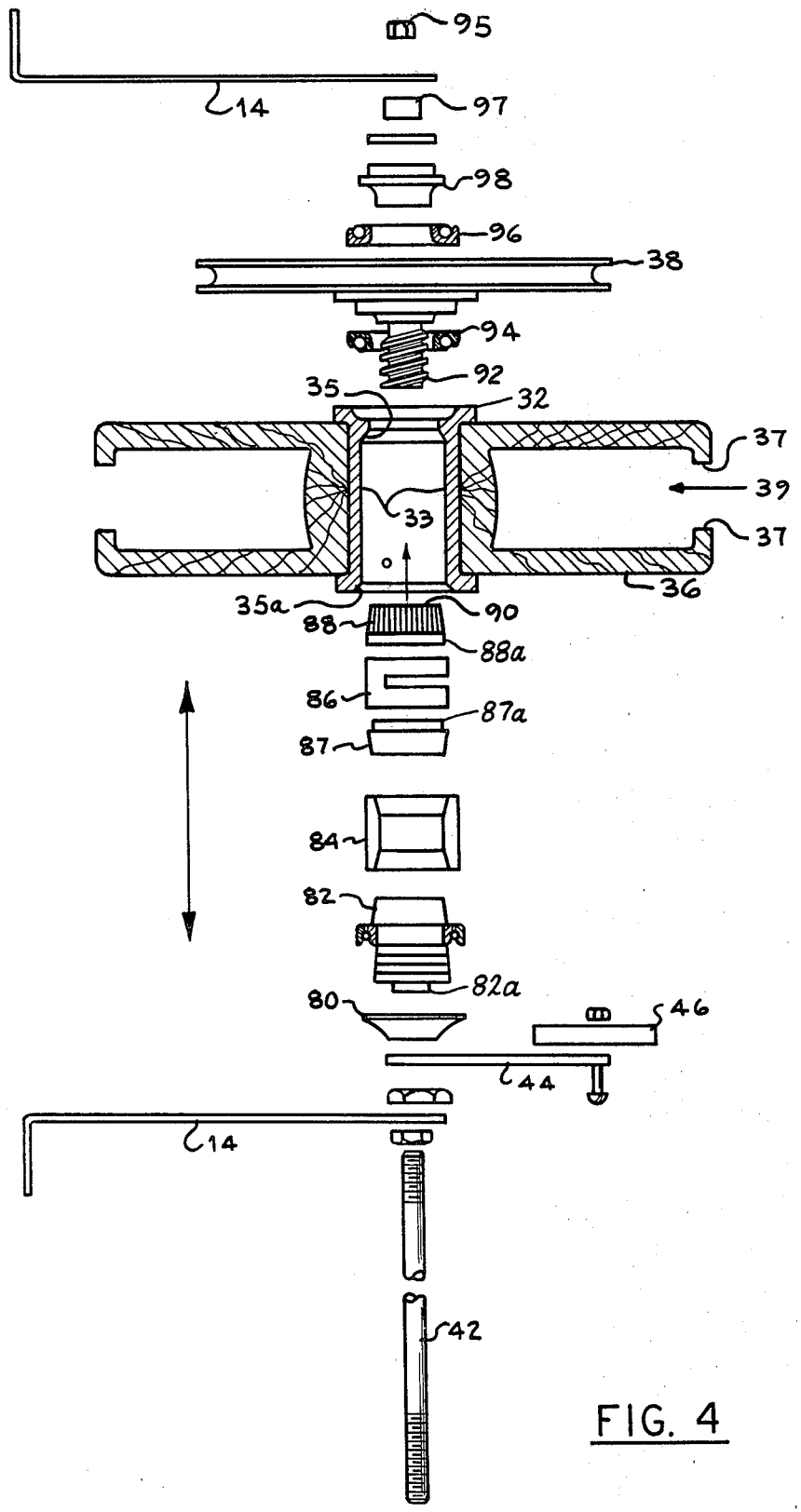
FIG. 4 illustrates a frontal perspective view of an exploded parts diagram of the clutch, spool and pulley mechanisms as taught by the first preferred embodiment of the present invention.

A pivot arm, shown generally as 44 in FIGS. 1 and 4, is fixed to the automatic clutch 40 and generally rotates about the threaded central shaft 42. Typically the pivot arm 44 rotates in a clockwise direction, as viewed in FIG. 1, in a manner dependent upon the tension or torque induced upon the spool 30 as it rotates about the central shaft 42 and in a counterclockwise direction when power is applied to the motor 20. A weight or additional mass 46 is typically attached to the distended end of the pivot arm 44 so as to bias the pivot arm 44 toward a vertically downward position (See FIG. 1 position) which acts as a reference position for the operation of the automatic clutch 40.

As the torque induced upon the spool 30 by the tension upon the fishing line 18 increases, the pivot arm 44, through the operation of the automatic clutch 40, will rotate in the clockwise direction. This rotation may continue until a predetermined limit of angular travel has been achieved. Typically, this predetermined limit is characterized by the weight 46 coupled to the distended end of the pivot arm 44 communicating with a limit stop 62 coupled to one of the side supports 14 of the frame 10. In a first preferred embodiment of the present invention this limit stop 62 comprises a relatively fixed, resilient appendage which acts as a physical barrier or stop to the motion of the pivot arm 44.

As an additional accessory, an electrical switch device 29 may be coupled to the limit stop 62 in order to be actuated when the pivot arm 44 communicates with the limit stop 62. This limit switch 29 typically is coupled to the electrical conductor 27 for providing the same basic function as the manual power switch 28. As the predetermined torque limit upon the spool 30 is exceeded, the pivot arm 44 will communicate with the limit stop 62 and therefore actuate the limit switch 62, thereby applying power to the electrical motor 20. A visual or audible indicator should be actuated responsive to the limit switch 29 supplying electrical energy to the electrical motor 20 in order that the operator will be made aware of the operation of the motorized fishing reel. In the alternative, the limit switch 29 may be of the "delayed-off" type which will supply electrical power to the motor 20 to the period of time required to set the hook in the mouth of the fish and then remove power from the motor 20. Likewise, an indicator would be required in this configuration.

The construction and operation of the automatic clutch 40 will now be described with reference to FIGS. 1, 2 and 4. The automatic clutch 40 as utilized in the first preferred embodiment of the present invention is typically a Bendix coaster brake similar to the ones utilized on American bicycles. While the other previously discussed coaster brake mechanisms may be utilized, the following explanations will be provided with reference to Bendix Coaster Brake Model 76, as illustrated in FIG. 4.

The operative parts of the automatic clutch 40 include a male spiral gear 92 which is attached to the secondary pulley 38. The male spiral gear 92 couples within a female spiral gear 90 which is internal to a clutch cone 88. The circumferential skirt 88a on the clutch cone 88 couples with an expandable clutch cone retainer band 86. A bevelled brake shoe cone surface 87 also includes a skirt 87a which couples with the expandable clutch cone retainer band 86.

A bearing cover 80 is disposed over the bearings housed by a brake shoe cone 82. The bevelled surfaces of the brake shoe cones 82 and 87 communicate within a similarly bevelled receptacle surface within each of the brake shoes 84 (typically 2 or more). The outer circumferential surface of the brake shoes 84 couples with the inner circumferential surface of the spool core 33.

A square shank or nut 82a communicates through the bearing cover 80 and attaches within a congruent aperture (not shown) within the pivot arm 44. A weight 46 is attached to the distended end of the pivot arm 44 as previously discussed.

When the secondary pulley 38 is rotated, the male spiral gear 92, through its worm gear coupling with the female spiral gear 90, will pull the clutch cone 88 into communication with a clutch cone surface 35 located at the closed end of the spool core 33. This will pull together the bevelled surfaces of the brake shoe cones 82 and 87, which through their mutual communication with the brake shoes 84, will cause the outer circumferential surface of the brake shoes 84 to expand into close proximity with the inner spool core 33.

Grease has been inserted between the external circumferential surface of the brake shoes 84 and the inner spool core 33 for acting as a fluid drive (or non-metallic contact drive) therebetween. This grease has a viscosity which will allow some initial slippage between the brake shoes 84 and the inner spool core 33 responsive to a transient, sudden or impulse force, but which will not allow substantial slippage when a constant force or torque is exerted between the elements.

This operation is similar to the normal operation of the clutch when used as a bicycle brake with the following exceptions. Whereas in the bicycle mode of operation the force is exerted on the secondary pulley 38 to force the brake shoes 84 to expand into communication with the inner spool core 33 to stop the rotation therebetween, in the present mode and application the force is exerted through the fishing line 18 onto the spool 36 and then through the spool core 33 and the grease onto the brake shoes 84 and then to the secondary pulley 38. It should be noted that as the brake shoes 84 begin to rotate in sympathy with the spool core 33 through this fluid drive action, the brake shoes 84 will also cause the rotation of the brake shoe cones 87 and 82 upon the threaded shaft 42 in a direction which will cause the brake shoes 84 to expand, thereby increasing the effective coupling with the spool core 33 in the form of a mechanical feedback or locking loop. This action will then lock or secure the spool 36 to the secondary pulley 38 through the functional contact between the clutch cone 88 and the clutch cone surface 35 as previously explained.

In all other substantial respects, the automatic clutch 40 operates as it would in the normal mode when used as a bicycle brake, except for the direction of power flow is reversed.

The functional operation of the clutch 40 will now be considered from one of two possible starting modes, that is, a free wheeling mode or the engaged mode. It will be obvious to one skilled in the art of bicycle brake design that in the engaged mode the outer circumferential surface of the brake shoe 84 is operatively coupled to the inner spool core 33, while in the free wheeling mode these two surfaces are not coupled and there is relative freedom of rotational motion therebetween.

First, it will be assumed that the automatic clutch 40 is in the free wheeling or unwinding mode in which the only resistance acting upon the spool 30 is exerted by the brush 60. In this mode a male spiral gear 92 has operably disengaged from a female spiral gear 90 which is located internal to a clutch cone 88. This will provide a free rotation of the spool 30 about the central shaft 42. In this mode any increase in the torque on the spool 30 caused by a sudden increase in the tension upon the fishing line 18 will cause a brake shoe 84 to communicate with an internal circumferential surface or spool core 33 of the central hub 32. This action will cause the female spiral gear 90 to operably engage with the male spiral gear 92. Then, the external surface of clutch cone 88 will functionally couple with the inner clutch cone surface 35, which in turn will engage the secondary pulley 38 with the spool 30. This engagement will provide a one-to-one rotational correspondence between the rotation and angular position of the secondary pulley 38 as compared with the rotation and angular position of the spool 30.

In order to describe a second engagement mode, it will be assumed that the spool has been returned to the unwinding or free-running mode as previously discussed. After the fishing line 18 has been played out to the desired length, the operator may manually engage or couple the secondary pulley 38 with the spool 30 by merely actuating the main power switch 28, which will cause the electrical motor 20 to exert a tension on the drive belt 26 which will in turn rotate the secondary pulley 38. This rotation of the secondary pulley 38 will rotate the male spiral gear 90 internal to the clutch cone 88. This action will cause the outside circumferential surface of the clutch cone 88 to resistively couple with a clutch cone surface 35 adjacent to the smaller open end of the central hub 32, thereby firmly engaging the secondary pulley 38 with the rotation of the spool 30.

In this mode the anti-rotational resistance produced by the motor 20 will prevent any further unwinding of the fishing line 18. The operator may manually actuate the main power switch 28, thereby supplying electrical energy to the electrical motor 20 for rotating the spool 30 through its coupling with the automatic clutch 40 (as described above), the secondary pulley 38, the drive belt 26, and the primary drive pulley 22. In this manner the operator may "reel in" the fishing line 18 for storage upon the convex circumferential surface 34 of the spool 30.

When the operator desires to completely disengage the secondary pulley 38 from the spool 30, the operator has only to exert a tension upon the fishing line 18 sufficient to produce an angular displacement of the pivot arm 44 in the counterclockwise direction (as shown in FIG. 1) until the weight 46 couples with the limit stop 62. The operator then completely releases the tension on the fishing line 18, which will cause the automatic clutch 40 to completely disengage the rotation of the spool 30 from the secondary pulley 38.

This disengagement is accomplished as follows. The pivot arm 44 has been rotated clockwise to the stop 62 at which time the weight 46 attached to the distended end thereof will draw the pivot arm 44 in a counterclockwise rotation and therefore toward the normal rest position. This rotation of the pivot arm 44 will cause the male spiral gear 92 to back off or partially disengage from its coupling with the female spiral gear 90 inside the clutch cone 88. This will allow the clutch cone 88 to disengage from the operative coupling with the clutch cone surface 35 of the spool 30.

It is important to note that a grease film has been inserted on the internal surface of the spool core 33 and the external circumferential surface of the brake shoe 84. The grease is normally inserted through a bore 31 which communicates through the spool side 36 and into the spool core wall 33. Typically, a multi-purpose lubricating grease of the type utilized for automotive universal joints is utilized to provide this anti-friction coupling. The density and characteristics of the grease are very important. For example, if a grease having too much density is utilized, the brake shoe 84 will be coupled with greater effectiveness with the inner spool core 33, thereby causing the male spiral gear 92 to prematurely engage with the female spiral gear 90, thus severely limiting the speed at which the spool 30 will freerun. If the grease is too light in density, the anti-fiction coupling between the brake shoe 84 and the inner spool core 33 will never elevate the angular rotation of the pivot arm 44 to a position sufficient to cause a release of the clutch 40 because no counterclockwise rotation of the pivot arm 44 will be available. Thus, the density of the grease will cause a fluid (friction due to the viscosity of the grease) coupling between the inner spool core 33 and the brake shoes 84. This will cause the weighted arm 46 to move clockwise upwardly, thereby causing the rotation of the brake shoe cone 82 on the threaded central shaft 42, which causes the clutch cone 88 to engage the clutch cone surface 35 of the spool 30. As previously explained, this engagement process enlarges the outer circumferential diameter of the brake shoes 84 so as to frictionally couple the brake shoes 84 with the inner spool core 33 of the spool 30. This movement may be responsive to a tension produced on the fishing line 18 corresponding to a fish being coupled to the hook at the end of the fishing line.

With reference to FIG. 2, a ratchet device comprises a one-way ratchet arm 25a which is pivotally coupled to the frame 24 and a single lug 25b (as seen in the broken lines of FIG. 2) which is fixed to the primary pulley 22. The one-way ratchet arm 25 is biased by the tension spring 25s so as to communicate with the single lug 25b in order to prevent the rotation of the primary pulley 22 in a direction which will unwind the fishing line 18 from the spool 30. The purpose of this ratchet device 25 is to prevent the rotation of the primary pulley 22, and thereby induce drag upon the rotation of the spool 30 by the frictional communication between the drive belt 26 as it communicates through and over the fixed primary pulley 22 coupled to the electrical motor 20.

This ratchet 25 will obviously disengage when electrical energy is applied to the electrical motor 20, thereby causing the rotation of the primary pulley 22 in a direction for winding the fishing line 18 onto the spool 30. If the adjustment of the mounting 24 prevents a sliding frictional communication between the drive belt 26 and the primary pulley 22, the rotation of the spool 30 will be prevented in response to an increased tension on the fishing line 18. This lack of rotation of the spool 30 will preclude the counterclockwise rotation of the pivot arm 44, which will in turn prevent the normal operation of the automatic clutch 40 for disengaging the second pulley 38 from the spool 30. Therefore, it is necessary to properly adjust the adjustable mount 24 to allow for a positive forward engagement but a loose sliding rearward engagement between the drive belt 26 and the primary pulley 22.

The following procedure represents the normal sequence of actions involved in using the present invention in commercial fishing applications. It will first be assumed that all of the fishing line 18 has been wound onto the spool 36, and that the secondary pulley 38 has been rotated such that the clutch cone surface 35 is frictionally coupled with the clutch cone 88 in order to effect the operative coupling between the secondary pulley 38 and the spool 36.

The operator first provides a slight but even tension on the fishing line 18 in order to rotate the lever arm 44 and the weight 46 attached thereto in a counterclockwise direction (as illustrated in FIG. 1) for an angular travel of approximately 20 to 30 degrees. The operator then releases the tension on the fishing line 18 allowing the arm 44 and the weight 46 to return to the normal vertical orientation. This action disengages the automatic clutch 40, thereby allowing the spool 36 to rotate freely and independently of the secondary pulley 38. In this mode, the only resistance provided against the unwinding of the fishing line 18 is the resistance of the brush 60 against the side surface of the spool 36. This free wheeling mode of the automatic clutch 40 is provided when the clutch cone 88 has been withdrawn from operative and frictional communication with the clutch cone surface 35. This mode of operation of the automatic clutch 40 is well known and is normally utilized in the operation of the automatic clutch 40 in the bicycle mode.

Since the spool 36 is now capable of freely rotating, the fisherman merely throws the baited hook from the boat and allows the hydrodynamic pressure of the water acting upon the bait to unwind the fishing line 18 from the spool 36 as the boat moves over the surface of the body of water. During this time is typically when the line is subject to fouling upon the spool 36 if the automatic clutch 40 in accordance with the present invention is not utilized.

However, in the case of the present invention, if a fish is to hit the baited hook on the fishing line 18, thereby providing a sudden impulse or strike tension on the fishing line 18, the impulse will be transferred to a rotational motion of the spool 36, which in turn is transferred through the grease to the brake shoes 84 as previously discussed. This fluid drive coupling of the rotational motion of the inner spool core surface 33 and the brake shoes 84 will cause the brake shoes 84 to begin to rotate, which in turn will cause the two cone surfaces 82 and 87 to rotate on the threaded shaft 42. This rotation of the cone surfaces will cause the effective diameter of the brake shoes 84 to expand, thereby providing increased frictional coupling between the brake shoes 84 and the inner spool core surface 33. At the same time the rotation of these elements will cause the clutch cone 88 to be drawn into effective coupling with the clutch cone surface 35 through the action of the spiral gears 92 and 90 as previously described. Thus, the secondary pulley 38 will be effectively coupled with the spool 36 in order to provide a substantial resistance to the unwinding of the fishing line 18 therefrom.

If the motor 20 is not actuated, the counter emf forces within the motor will prevent the unwinding of the spool 36. The operation of the ratchet 25 will assist in preventing the reverse rotation or unwinding of the fishing line 18 from the spool 30 if the ratchet has been engaged. This resistance will prevent the unrestricted unwinding of the fishing line 18 from the spool 30 which will thereby cause a setting of the hook in the mouth of the fish. When the fisherman is able to devote his attention to this particular fishing reel, he may merely actuate the switch 28 for providing power to the motor 20. The rotation of the motor 20 will be coupled through the belt 26 to the secondary pulley 38, which as previously explained will be coupled through the automatic clutch 40 to wind the fishing line 18 onto the spool 30.

In the alternative, if the operator desires to allow the bait to be trolled at a predetermined length of fishing line 18 behind the boat, then he merely waits until this predetermined length of fishing line 18 as been unwound from the spool 30 and then momentarily actuates the main power switch 28. This momentary torque will cause the pivot arm 44 to rotate in a counterclockwise manner (possibly until it communicates with the limit stop 62), thereby positively coupling the secondary pulley 38 with the spool 30 in the manner as previously described. This condition allows the operator to troll with the baited hook behind the boat until the fish takes the hook and begins to run. If the hook does not set itself, the operator may set the hook by actuating the main power switch 28 for winding the fishing line 18 onto the spool 30.

After the fish has been boated, the operator must manually put tension on the fishing line 18 to rotate the pivot arm 44 in the counterclockwise direction until the weight 46 communicates with the limit stop 62. The operator may then release the tension upon the fishing line 18 which will cause the pivot arm 44 to rotate in the clockwise direction thereby disengaging the spool 30 from the positive coupling with the secondary pulley 38. The operator is then ready to begin playing out the fishing line or whatever step is necessary in the work process. It is important to note that in this free running mode the operation of the automatic clutch 40 will allow the operator to manually extend fishing line 18 only if a smooth constant tension is maintained upon the fishing line. However, any impulse torque exerted upon the spool 30 will cause the rotation of the pivot arm 44, and if this torque exceeds the predetermined limit the weight 46 will communicate with the limit stop 62, thereby causing the automatic clutch 40 to directly couple the spool 30 with the secondary pulley 38 in order to initiate resistance to the further unwinding of the fishing line 18 from the spool 30.

An added feature of the present invention employs a limit switch 29 which is coupled to the limit stop 62 for being actuated by the operation of the pivot arm 44. This limit switch is typically of the self-latching electrical type which will, upon being momentarily actuated, lock itself in the closed position for maintaining power to the electrical motor 20. Once the main switch 28 or other similar device interrupts the continuity of electrical power fed to the electrical motor 20, the limit switch 29 will open thereby returning control of the electrical motor 20 to the operator. During normal operation, the actuation of the limit switch 29 will automatically start the electrical motor 20, which through the action of the automatic clutch 40 will be coupled directly through the secondary pulley 38 to the spool 30, in order to wind the fishing line 18 onto the spool 30 and thus reel in the fish.

Thus, a first preferred embodiment and of the motorized fishing reel have been described as examples of the invention as claimed. However, the present invention should not be limited in its application to the details and constructions illustrated in the accompanying drawings or the specification, since this invention may be practiced or constructed in a variety of other different embodiments. Also, it must be understood that the terminology and descriptions employed herein are used solely for the purpose of describing the general construction and the operation of the preferred embodiment, and therefore should not be construed as limitations on the operability or possible improvements of the invention.

I claim:

1. An automatic motorized fishing reel comprising in combination:
   a spool for receiving fishing line thereon when rotated in a first direction;
   drive means for rotating said spool;
   clutch means, operatively interposed between said spool and said drive means, for disengaging said spool from said drive means when in a first condition so as to allow said spool to freely rotate in a direction opposite said first direction for unwinding the fishing line therefrom, with said clutch means in a second condition for engaging said spool with said drive means for rotating said spool in said first direction; and
   clutch control means for switching said clutch means between said first and second conditions responsive to a rapid increase in the torque exerted between said spool and said drive means, whereby said spool will freely rotate when in said first condition for unwinding the fishing line therefrom but will transition into said second condition responsive to a rapidly increased tension on the fishing line characteristic of a fish taking and running with a hook attached to the end of the fishing line.

2. The automatic motorized fishing reel as described in claim 1 wherein said clutch means includes first and second surfaces for operatively engaging when said clutch means is in said second condition and for operatively disengaging when said clutch means is in said first condition; and
   wherein said clutch control means further includes fluid means coupled between said first and second surfaces for transferring torque between said surfaces for switching said clutch means between said first and said second conditions.

3. The automatic motorized fishing reel as described in claim 2 wherein said fluid means comprises a lubricant operatively interposed between said first and second surfaces for transferring motion therebetween when said clutch means is in said first condition.

4. The automatic motorized fishing reel as described in claim 2 wherein said clutch control means further includes in combination:
   a pivot arm movably coupled to said second surface of said clutch means for being rotated in one direction responsive to said rapid increase in the torque between said spool and said frame, with said clutch means remaining in said first condition in which said pivot arm is free to rotate in said first direction, with said clutch means transitioning into said second condition responsive to the rotation of said pivot arm being prohibited in said one direction; and
   limit means coupled to said frame for abutting with and limiting to a predetermined excursion the rotational motion of said pivot arm, whereby the angular excursion of said pivot arm will be limited as it communicates with said limit means for positively switching said clutch means from said first condition to said second condition.

5. The automatic motorized fishing reel as described in claim 4 wherein said clutch control means includes bias means for biasing said pivot arm in a direction opposite said one direction, thereby increasing the maximum limit of said torque on said spool before said clutch means engages from said first condition to said second condition.

6. The automatic motorized fishing reel as described in claim 5 wherein said bias means comprises a weighted mass coupled to said pivot arm adjacent a distended arm thereof, thereby utilizing gravity to bias said pivot arm into a vertically downward position.

7. The automatic motorized fishing reel as described in claim 4 wherein said drive means comprises an electromagnetic motor.

8. The automatic motorized fishing reel as described in claim 7 wherein said limit means further includes electrical switch means for energizing said electromagnetic motor responsive to said pivot arm actuating said limit means, whereby said electromagnetic motor will be automatically actuated to begin winding in the fishing line upon said spool.

9. The automatic motorized fishing reel as described in claim 2 further including friction means coupled between said spool and said frame for controllably restricting the free rotational motion of said spool, thereby reducing the probability of fishing line backlash due to an impulse strike on the fishing line.

10. The automatic motorized fishing reel as described in claim 2 wherein said clutch means comprises a coaster brake of the type wherein said first surface comprises a cylindrical hub having an inner braking surface, and wherein said second surface comprises a substantially cylindrical and expansible brake pad, and further including means for anchoring said brake pad against rotation and for expanding same into frictional contact with said inner braking surface of said cylindrical hub when in said second condition.

11. The automatic motorized fishing reel as described in claim 2 wherein said spool includes:
    a hub section having an outwardly convex circumferential surface for forcing the fishing line away from the circumferential center line of said hub while winding; and
    generally upstanding paired sides radially coupled to opposite ends of said hub, with the distended circumferential sections thereof defining inwardly projecting lips paired to restrain any fishing line backlash tangles therewithin.

12. An automatic motorized fishing reel comprising in combination:
    a spool for receiving fishing line thereon when rotated in a first direction;
    drive means for rotating said spool in said first direction;
    clutch means, operatively coupled to said spool and to said drive means, for disengaging in a first condition said spool from said drive means, with said clutch means including first and second surfaces thereon for releasibly engaging with each other when said clutch means is in a second condition so as to engage said drive means with said spool for producing rotation thereof in said first direction; and
    clutch control means including fluid means juxtaposed between said first and second surfaces for transferring torque therebetween so as to switch said clutch means between said first and second conditions.

* * * * *